(12) United States Patent
Maruyama et al.

(10) Patent No.: US 8,300,358 B2
(45) Date of Patent: Oct. 30, 2012

(54) MAGNETIC HEAD HAVING WRITE POLE, FIRST SOFT MAGNETIC FILMS SEPARATELY DISPOSED ON BOTH SIDES OF THE MAIN POLE, AND A SECOND SOFT MAGNETIC FILM DISPOSED ON A TRAILING SIDE OF THE MAIN POLE

(75) Inventors: Yohji Maruyama, Saitama (JP);
Tadayuki Iwakura, Kanagawa (JP);
Kimitoshi Etoh, Kanagawa (JP);
Hiromi Shiina, Ibaraki (JP); Kazue Kudo, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 917 days.

(21) Appl. No.: 12/070,155

(22) Filed: Feb. 15, 2008

(65) Prior Publication Data
US 2008/0198507 A1    Aug. 21, 2008

(30) Foreign Application Priority Data
Feb. 16, 2007   (JP) .................................. 2007-036288

(51) Int. Cl.
*G11B 5/127* (2006.01)
(52) U.S. Cl. ................................................... 360/125.14
(58) Field of Classification Search . 360/125.02–125.15
See application file for complete search history.

(56) References Cited

U.S. PATENT DOCUMENTS

| | | | |
|---|---|---|---|
| 5,075,956 A | 12/1991 | Das | |
| 2002/0176214 A1 | 11/2002 | Shukh et al. | |
| 2005/0128637 A1 | 6/2005 | Johnston et al. | |
| 2005/0162778 A1 * | 7/2005 | Kimura et al. | 360/126 |
| 2006/0000794 A1 | 1/2006 | Le | |
| 2006/0119984 A1 | 6/2006 | Nishida et al. | |

FOREIGN PATENT DOCUMENTS

| | | |
|---|---|---|
| EP | 1503372 A2 | 2/2005 |
| EP | 1522991 A1 | 4/2005 |
| JP | 2004-127480 A | 4/2004 |
| JP | 2004-185672 A | 7/2004 |
| JP | 2006-164356 | 6/2006 |

OTHER PUBLICATIONS

The extended European Search Report corresponding to the Application No. 08250294.9-1232, date of mailing Apr. 23, 2009, 8 pages total.

* cited by examiner

*Primary Examiner* — Joseph Feild
*Assistant Examiner* — Gustavo Polo
(74) *Attorney, Agent, or Firm* — Zilka-Kotab, PC (57) ABSTRACT

Embodiments of the present invention help to suppress broadening of a write field of a main pole of a perpendicular recording head and realize high-quality write operation. According to one embodiment, a main pole of a write head extends to an air bearing surface or a medium-facing surface and has an inverted trapezoid in cross-section. First soft magnetic films called side shields are separately disposed through a nonmagnetic film on both sides of the main pole. The air bearing surface side end of the first soft magnetic film is provided to recede from the air bearing surface. The first soft magnetic film and the main pole are formed in the same layer. A second soft magnetic film called a trailing shield is provided above the main pole on the air bearing surface side via a nonmagnetic film.

11 Claims, 10 Drawing Sheets

MAGNETIC HEAD HAVING WRITE POLE, FIRST SOFT MAGNETIC FILMS SEPARATELY DISPOSED ON BOTH SIDES OF THE MAIN POLE, AND A SECOND SOFT MAGNETIC FILM DISPOSED ON A TRAILING SIDE OF THE MAIN POLE

CROSS-REFERENCE TO RELATED APPLICATION

The instant nonprovisional patent application claims priority to Japanese Patent Application No. 2007-036288 filed Feb. 16, 2007 and which is incorporated by reference in its entirety herein for all purposes.

BACKGROUND OF THE INVENTION

Storage (recording) devices for information equipment mainly use a semiconductor memory or a magnetic memory. The semiconductor memory is typically used as an internal storage device in view of access time, whereas the magnetic disk drive is typically used as an external storage device in view of large capacity and nonvolatility. A memory capacity is an important index indicating the performance of a magnetic disk drive. Along with the recent development of information society, large capacity and small-sized magnetic disk drives are required by the market. A recording system suitable for the requirement is perpendicular recording. It is considered that the perpendicular recording becomes mainstream instead of the conventional longitudinal recording because high density can be promoted.

U.S. Patent Publication No. 2002/0176214 ("patent document 1") discloses a perpendicular recording magnetic head that suppresses broadening of an unnecessary magnetic field across track width by disposing a soft magnetic film on both sides of a main pole in the track-width direction. Japanese Patent Publication No. 2006-164356 ("patent document 2") discloses a perpendicular recording magnetic head that prevents a stray magnetic field from concentrating on a magnetic head element by the following. A soft magnetic shield is provided to surround the upper portion and lateral sides of the magnetic head element, thereby making the distance between the soft magnetic shield and a medium smaller than that between the soft magnetic shield and the magnetic head element.

The magnetization direction of a recording medium of perpendicular recording is perpendicular to the surface of the medium; therefore, an effect of demagnetizing field acting between adjacent magnetic domains in the recording medium of perpendicular recording is smaller than that of longitudinal recording. For this reason, high-density magnetic information can be recorded in the medium, which makes it possible to construct a large capacity magnetic disk.

In perpendicular recording, a main pole has a flare point and magnetic flux is restricted at the flare point to generate a strong magnetic field. A write field from the main pole has an effect on a track-width direction as well as on a continuously recording bit-direction. Since adjacent bit information is written in the track-width direction, there is a problem in that an extremely strong magnetic field erases the magnetic information outside a write area during write operation. Patent documents 1 and 2 mentioned above describe head configurations to solve such a problem.

It was confirmed by computational simulation that the technique described in patent document 1 can enable objective recording quality and retainment of adjacent recording information. However, the following was found in order to satisfy the objective. It is necessary that the backward length of the soft magnetic film provided on both sides of and close to the main pole is set to an extremely short length (50 to 200 nm) with a high degree of accuracy (±10 nm). In addition, it is necessary that the flare point of the main pole is set to 50 to 200 nm with a high degree of accuracy (±10 nm) in order to generate a strong magnetic field. It was found that the formation accuracy (film thickness and backward length) of such members needs to be set at as extremely accurate as a range of ±10 nm in order to achieve high quality recording operation as an objective. Thus, if perpendicular recording heads were manufactured by the commercially available semiconductor manufacturing equipment, manufacturing yield was low so that inexpensive heads could not be mass-produced.

According to the technique described in patent document 2, since the end of the soft magnetic shield is disposed at a position spaced extremely apart from the main pole (1 μm or more), an effect of suppressing the broadening of the magnetic field across the track-width is insufficient.

In order to achieve this effect, it is necessary to set the formation accuracy of members forming the head at an extremely high level. In the case of manufacturing perpendicular recording heads by commercially available manufacturing equipment, a manufacturing yield is low so that inexpensive heads cannot be mass-produced.

BRIEF SUMMARY OF THE INVENTION

Embodiments of the present invention help to suppress broadening of a write field of a main pole of a perpendicular recording head and realize high-quality write operation. According to the particular embodiment of FIG. 1, a main pole 11 of a write head 200 extends to an air bearing surface 98 or a medium-facing surface and has an inverted trapezoid in cross-section. First soft magnetic films 10 called side shields are separately disposed through a nonmagnetic film 51 on both sides of the main pole 11. The air bearing surface side end of the first soft magnetic film 10 is provided to recede from the air bearing surface 98. The first soft magnetic film 10 and the main pole 11 are formed in the same layer. A second soft magnetic film 12 called a trailing shield is provided above the main pole 11 on the air bearing surface side via a nonmagnetic film 14.

DETAILED DESCRIPTION OF THE INVENTION

Embodiments of the present invention relate generally to magnetic heads and more particularly to a magnetic head used for a magnetic disk drive of perpendicular magnetic recording suitable to record high-density magnetic information in a medium surface and a method of manufacturing the magnetic head.

It is an object of embodiments of the present invention to provide a magnetic head that can suppress broadening of a write field from a main pole and has a process margin.

It is another object of embodiments of the present invention to provide a magnetic head manufacturing method that can shorten a manufacturing process and is excellent in mass productivity.

To achieve the above objects, a typical magnetic head of embodiments of the present invention may be characterized in that a portion of a main pole or magnetic field application means is extended to an air bearing surface, first soft magnetic films are separately disposed on both sides of the main pole, an end of a first soft magnetic film pattern closest to a recording medium is set at a position receding from the air bearing surface, and a second soft magnetic film is provided on the trailing side of the main pole.

The first soft magnetic films and the main pole are formed in the same layer.

The first soft magnetic films provided on both sides of the main pole may be configured to be provided in contact with the main pole, have an air bearing surface side end receding from the air bearing surface and have a portion parallel to the air bearing surface, and a portion further receding from the portion parallel thereto in the vicinity of the main pole.

A method of manufacturing the magnetic head is characterized in that, in resist formed on a nonmagnetic film, an opening is formed in an area where the main pole and the first soft magnetic films are formed and a soft magnetic material is deposited in the opening. Thus, the main pole having a portion extending to an air bearing surface to define a track width and a portion whose width progressively broadens as receding from the air bearing surface, and the first soft magnetic films separately disposed on both sides of the main pole and having an air bearing surface side end receding from the air bearing surface are formed by the same process.

According to embodiments of the present invention, the air bearing surface side end of the soft magnetic film suppressing the broadening of the write field of the main pole is allowed to recede from the air bearing surface. Thus, if the flare point position of the main pole is displaced by a wafer process or a machining process, the backward length of the soft magnetic film is not changed unless the edge of the soft magnetic film comes into contact with the air bearing surface. Consequently, the magnetic head having a large process margin can be realized and a variation of an effect of suppressing the broadening of a write field can be prevented.

Figure 3A:
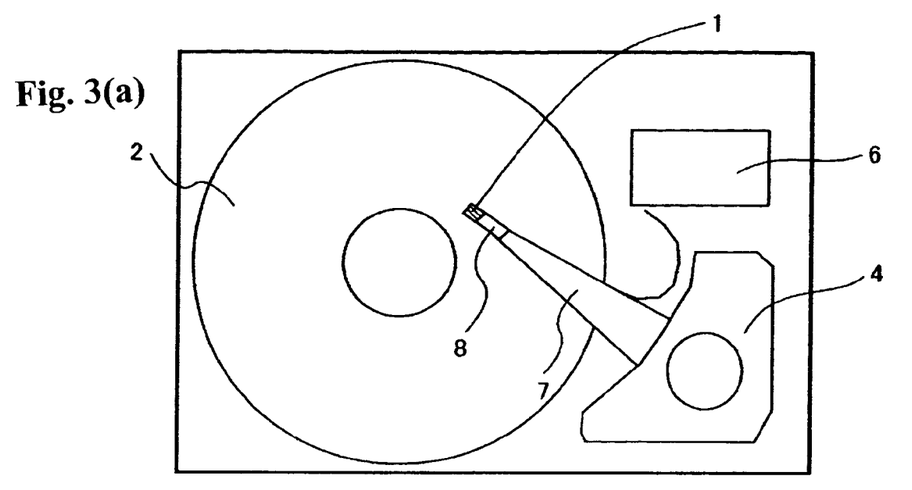
FIGS. 3(a) and 3(b) include a plan view and a cross-sectional view illustrating a schematic configuration of a magnetic disk drive using the magnetic head of embodiments of the present invention.
Figure 3B:
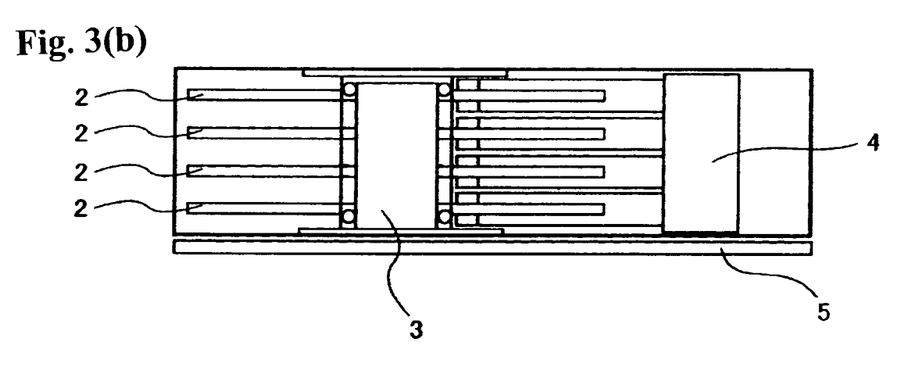

FIG. 3 illustrates a basic configuration of a magnetic disk drive using perpendicular recording. FIG. 3($a$) is a plan view of this drive and FIG. 3($b$) is a cross-sectional view. Recording media 2 are supported by a spindle motor 3 and rotated at the time of inputting/outputting information. A magnetic head 1 is supported by a suspension 8, which is supported by a rotary actuator 4 via an arm 7. The suspension 8 presses the magnetic head 1 toward the recording medium 2 and holds it at a position balanced with a lifting force undergone from the viscous laminar flow of the rotating recording medium 2. A read/write circuit 6 includes a waveform equivalent circuit, amplifies a read signal from the magnetic head 1 and supplies a write current to the magnetic head 1. A circuit board 5 is mounted with a signal processing circuit which decodes a read signal amplified by the read/write circuit 6 and codes write date supplied to the read/write circuit 6. In addition, the circuit board 5 is mounted with a control circuit of the spindle motor 3 and with a control circuit of the rotary actuator 4. Unlike a Lorentz waveform appearing in longitudinal recording, a read waveform (the amplitude change of a read signal relative to a time-axis) obtained in perpendicular recording is a trapezoidal waveform; therefore, the waveform equivalent circuit and signal processing circuit are different from those in longitudinal recording.

Perpendicular recording uses the recording medium 2 having an axis of easy magnetization perpendicular to a recording surface. The substrate uses a glass or Al substrate. A soft magnetic underlayer (SUL: soft under layer) and a magnetic thin film forming a recording layer are formed on the substrate. A write field from a main pole acts on the recording medium 2 to reverse the magnetization of the recording layer. The perpendicular recording needs to use a magnetic field component of such perpendicular direction for recording; therefore, the soft magnetic underlayer is provided between the recording layer and the substrate.

A write element performing electromagnetic conversion is used to write magnetic information in such a recording medium 2. In addition, a read element using a magnetoresistive phenomenon, a gigantic magnetoresistive phenomenon or an electromagnetic induction phenomenon is used to read magnetic information. These write element and read element are provided on an input/output component called a slider to constitute the magnetic head 1. The magnetic head 1 radially moves above a recording medium surface along with turn of the rotary actuator 4, is positioned at an optional track, and then performs writing or reading of magnetic information.

Figure 1:
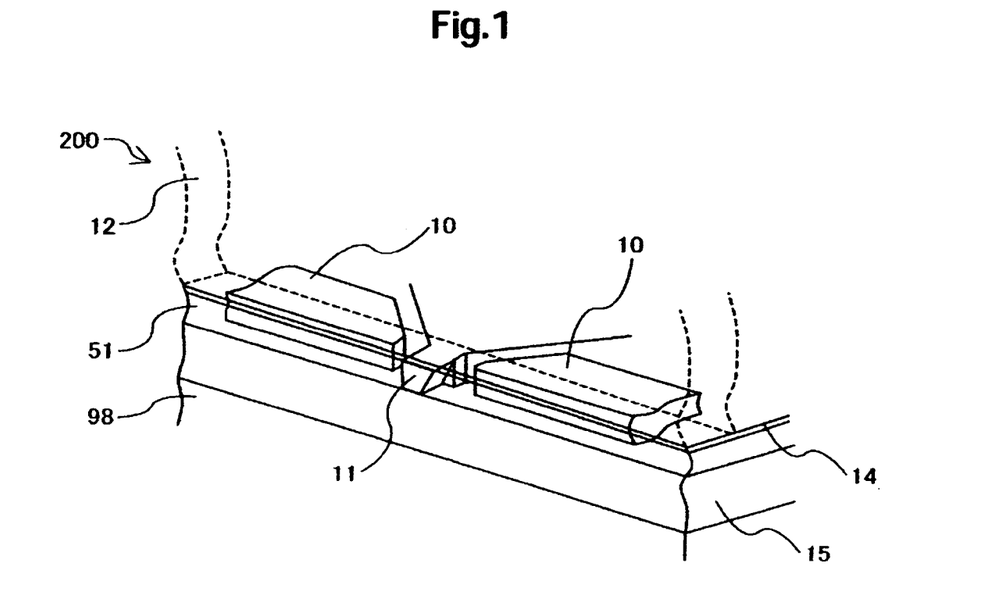
FIG. 1 is an enlarged perspective view of a write head portion of a magnetic head according to a first embodiment.
Figure 2:
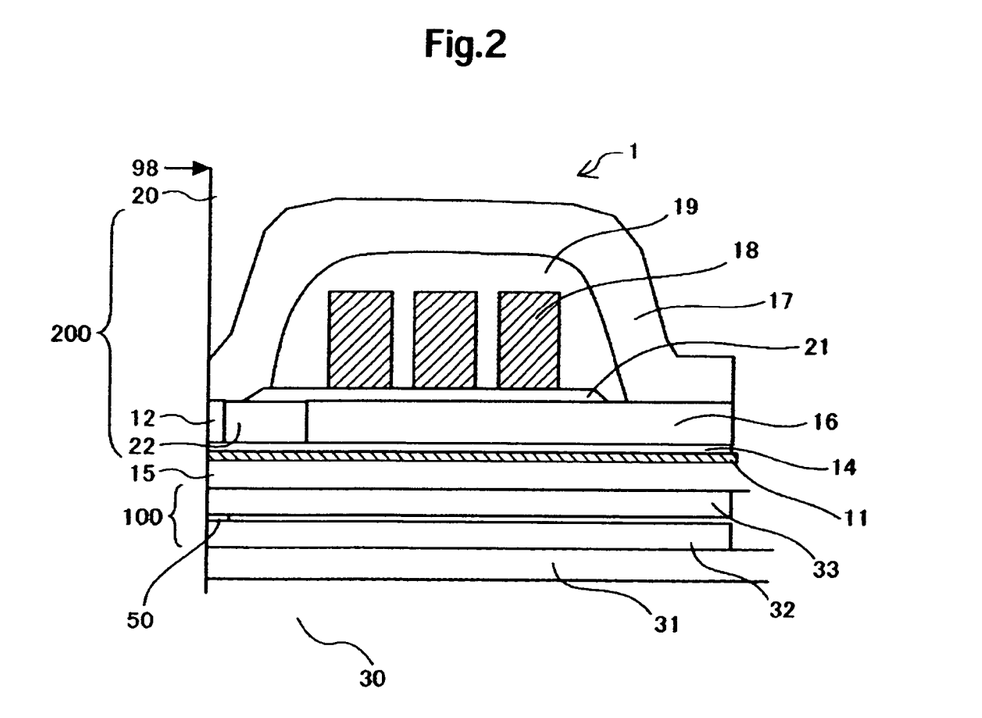
FIG. 2 is a cross-sectional view of the entire construction of the magnetic head according to the first embodiment.

A configuration of a magnetic head according to a first embodiment is described with reference to FIGS. 1 and 2. FIG. 1 is an enlarged view illustrating an essential portion constituting a write element of the magnetic head. FIG. 2 is a cross-sectional view illustrating the entire configuration of the magnetic head. In FIG. 1, a main pole 11 of a write element 200 extends to an air bearing surface 98 which is a medium-facing surface and has an inverted trapezoid in cross-section. First soft magnetic films 10 called side shields are separately disposed on both sides of the main pole 11. An air bearing surface side end of the first soft magnetic film 10 is provided to recede from the air bearing surface 98. A portion of the main pole 11 extending to the air bearing surface is formed rectangular at a position adjacent to the first soft magnetic film and remote from the air bearing surface. These members are formed on a nonmagnetic film 15. A write track width is defined by an edge of an upper portion of the main pole 11, the edge having a wide width. The main pole 11 is magnetically connected to a second soft magnetic film 12 called a trailing shield via a nonmagnetic film 14. The presence of the nonmagnetic film 14 and the second soft magnetic film 12 is not indispensable for suppressing broadening of the magnetic field across the track-width but is needed to steepen the gradient of the write field. However, the high-density recording area needs a write field having high-gradient of magnetic field, which makes a combination with the second soft magnetic film 12 indispensable.

Referring to FIG. 2, the read element 100 and write element 200 are formed on a slider substrate 30. The read element 100 is basically composed of an insulating film (underlayer film) 31 provided on the slider substrate 30, a lower shield 32, an element section 50 for detecting magnetic information, and an upper shield 33. The write element 200 is separated from the read element 100 by a nonmagnetic film 15. In the present embodiment, the main pole 11 is disposed at the lowermost layer of the write element 200. This arrangement can easily reduce the distance between the read element 100 and the main pole 11, which can enhance an efficiency of a recording format on the recording medium.

As shown in FIG. 1, the first soft magnetic film 10 exists on both sides of the main pole 11; however, it does not appear in FIG. 2 because FIG. 2 is a cross-sectional view of the central portion of the main pole 11 taken along the backward direction. The nonmagnetic film 14 is disposed on the main pole 11, which is magnetically connected to the second soft magnetic film 12 via the nonmagnetic film 14. The second soft magnetic film 12 is magnetically connected to an upper soft magnetic film 17 to form a closed magnetic path. The upper soft magnetic film 17 is magnetically connected to a lower soft magnetic film 16 at its rear end and further the lower soft magnetic film 16 is magnetically connected to the main pole 11 via the nonmagnetic film 14. A coil 18 is disposed in the closed magnetic path composed of such magnetic films. Since insulating films 21 and 19 are provided to ensure electric insulation from the magnetic films, a predetermined electric current can be applied to the coil 18.

Application of the current to the coil 18 leads magnetic flux from the upper soft magnetic film 17 to the main pole 11 through the lower soft magnetic film 16. The nonmagnetic film 14 is adapted to determine an amount of magnetic flux to be returned to the second soft magnetic film 12, the amount of the magnetic flux being part of the magnetic flux generated at the main pole 11. In addition, the nonmagnetic film 14 has a function of increasing the gradient of the write field. The film thickness of the nonmagnetic film 14 is determined depending on a flying height between the main pole 11 and the recording medium and set at a range from approximately 10 nm to 50 nm. Because of the nonmagnetic film 14 with small film thickness, the magnetic resistance of the lower soft magnetic film 16 and main pole 11 can be neglected if the superposed area between the main pole 11 and the lower soft magnetic film 16 is extremely broad. In the case of the present configuration where the magnetic resistance can be neglected, since the nonmagnetic film 14 and the main pole 11 can be made by the same pattern formation process, the manufacturing cost of the magnetic head 1 can advantageously be reduced. In view of shortening of the process, it can easily be understood by those skilled in the art that the second soft magnetic film 12 and the lower soft magnetic film 16 which are disposed to increase the gradient of the magnetic field can be formed by the same process.

As is clear from the figure, a void 22 occurs between the second soft magnetic film 12 and the lower soft magnetic film 16. This void 22 poses an impediment such as poor resolution or the like during the coil formation of a later process. Therefore, a process is needed to bury the void with a nonmagnetic material. In the present embodiment, a process is performed to bury the void with an alumina film after the second soft magnetic film 12 and the lower magnetic film 16 are formed.

For the purpose of protecting the entire element portion described above, a nonmagnetic, insulating protection film 20 is provided to cover the element portion. In the present embodiment, an alumina film having a thickness of 25 µm is provided as the protection film 20. A CoNiFe-based alloy having a saturation magnetic flux density of 2.2 T is used as the main pole 11, which has a thickness of approximately 200 nm. An NiFe-based alloy is used as the second soft magnetic film 12 and the lower soft magnetic film 16, each having a thickness of 1.2 µm. An NiFe-based alloy is used as the upper soft magnetic film 17, which has a thickness of 1.0 µm. Copper is used for the coil 18, which has a thickness of 2 µm. A polymer resin is used for the insulating film 19 and alumina is used for the other insulating films and nonmagnetic films.

Figure 4:
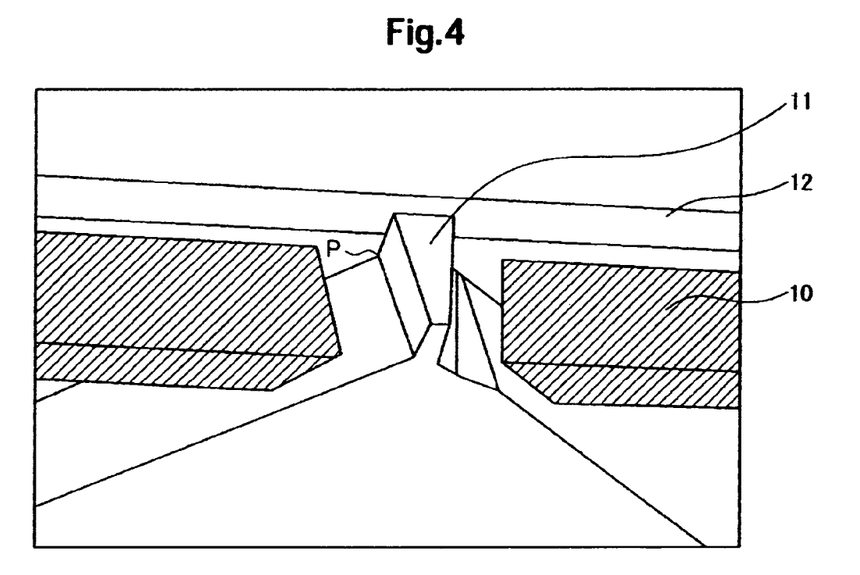
FIG. 4 is an enlarged view of the write head portion of FIG. 1 as viewed from the oblique downside.

FIG. 4 is an enlarged view of the main pole 11 extending to the air bearing surface, the first soft magnetic film 10 and the second soft magnetic film 12 (in the state where the main pole is viewed from the oblique downside). As described above, the main pole 11 is made of a CoNiFe-based alloy having a saturation magnetic flux density of 2.2 T and has a thickness of 200 nm and a track width of 90 nm. In addition, the slant of the inverted trapezoid has an angle of 8 degrees. The flare point P most influencing the field intensity is located 100 nm from the air bearing surface. The main pole 11 is shaped to be uniform from the air bearing surface to just before the flare point P and to have a rectangular portion just before the flare point P (see FIG. 1). However, the main pole 11 is shown with the rectangular portion omitted in FIG. 4. The first soft magnetic film 10 is spaced 150 nm from the main pole 11 at a position closest to the main pole 11. The first soft magnetic film 10 is made of the same material as that of the main pole 11, has the same film thickness as that of the main pole 11 and recedes 100 nm from the air bearing surface. The first soft magnetic film 10 has a backward length of 200 nm. Both the left and right first soft magnetic films (each of the separate soft magnetic films) have an almost-uniform backward length.

Field intensity was calculated in the case where a magnetomotive force of 0.3 AT is applied to the magnetic head 1 configured as described above and the magnetic head 1 is maintained at a magnetic flying height of 13.5 nm above the recording medium. The field intensity is influenced by the conditions of the SUL included in the recording medium. It was assumed here that the SUL has a saturation magnetic flux intensity of 1.35 T, a film thickness of 90 nm, and a magnetic distance of 57.5 nm from the main pole 11 (the generally used conditions). The result of the calculation was that an effective magnetic field (a write field sensed by the recording medium: the write field added with an in-plane component) of 12 kOe (96 kA/m) could be obtained. This value is sufficient intensity for the write field of a medium for perpendicular magnetic recording.

Figure 5:
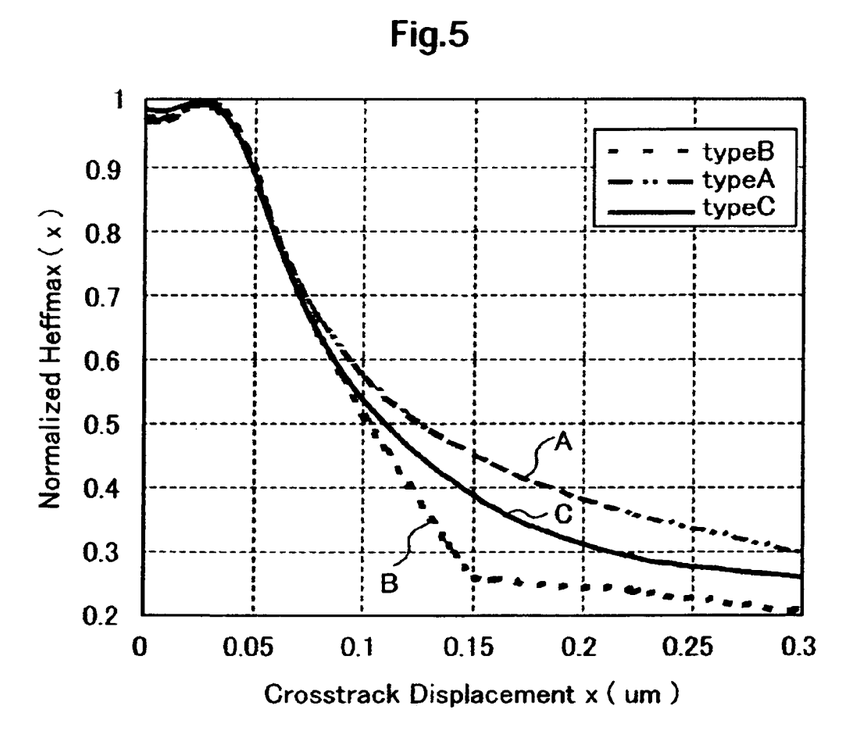
FIG. 5 illustrates the calculation results of magnetic distribution of a main pole.

The object of the present invention is to provide a magnetic head structure that can suppress the broadening of such a write field and provide a high process margin. In view of this point, the broadening of the write field across the track width was examined. The results are shown in FIG. 5. In the figure, the horizontal axis represents the position of track width direction (zero indicates the center of write track) and the longitudinal axis represents the normalized magnetic field (the effective magnetic field). The calculation results of the present embodiment are represented by type C. It is seen from the figure that the magnetic intensity has a peak in the vicinity of the geometric edge 0.045 μm (45 nm: 90 nm/2) of the main pole and progressively lowers as it goes away therefrom. To prevent an influence (erasure) on adjacent tracks, it is necessary to lower the magnetic field intensity of an area away from the geometric track edge. The inventers' experiences have shown that a magnetic field about 0.5 time as small as the write field has no influence on the recording medium. Thus, it can be said that the present embodiment has no influence on a medium area away 0.11 μm (110 nm) from the center of the main pole 11. This effect is compared with those of other structures.

Figure 6:
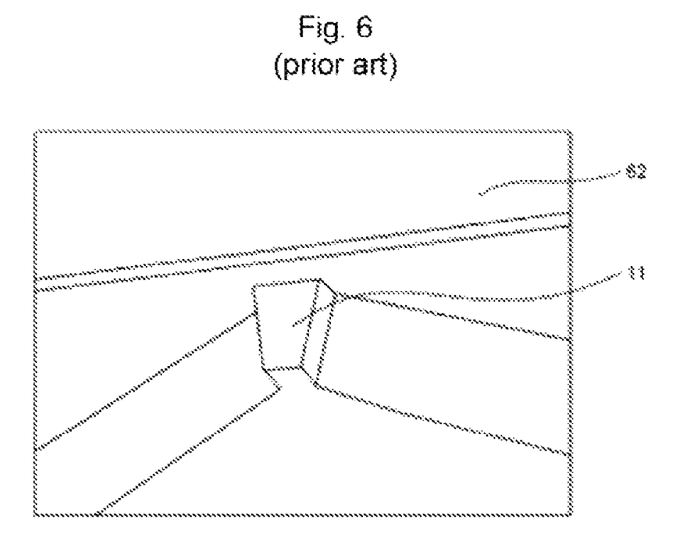
FIG. 6 is an enlarged view of a write head portion of the conventional art as viewed from the oblique downside.
Figure 7:
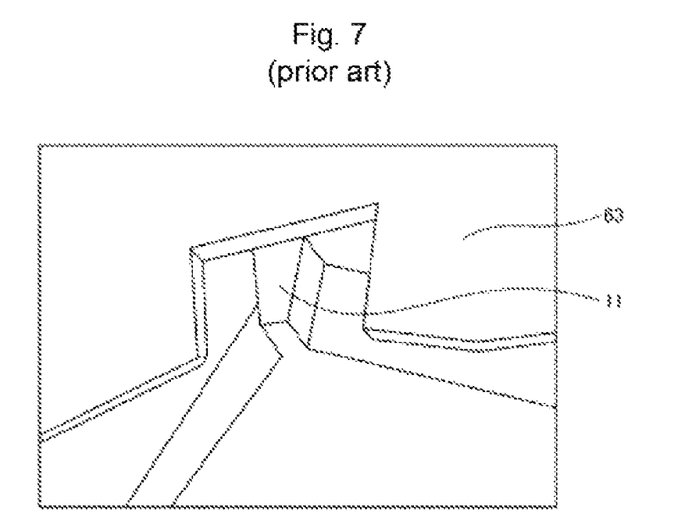
FIG. 7 is an enlarged view of a write head portion of the conventional art as viewed from the oblique downside.

FIG. 6 is an enlarged view of a structure where the first soft magnetic film is not provided on both sides of a main pole 11. In this case, only a second magnetic film 62 is disposed close to the main pole 11. This structure is called type A. FIG. 7 illustrates a structure that belongs to the category of patent document 1, in which a main pole 11 is surrounded by a soft magnetic film 63 from the air bearing surface side. This structure is called type B. In each of FIGS. 6 and 7, the width, thickness and material of the main pole 11 and the position of the flare point are the same as those of the first embodiment described above. Each of the soft magnetic films 62 and 63 has a backward length of 100 nm and extends uniformly.

FIG. 5 collectively shows the calculation results of the magnetic field distribution in the track width direction for the structures described above. It can be seen from the figure that type A having no soft magnetic films on both sides of the main pole has a wide width influenced by the write field. On the basis of the estimation from the empirical rule of the present inventors, it is probable that the write field has an influence on a range of approximately 0.125 μm (125 nm) from the center of the main pole. On the other hand, it can be seen that in type B where the soft magnetic film 63 surrounds the air bearing surface side of the main pole, the write field has an influence on a range of approximately 0.1 μm (100 nm) from the center of the main pole, which means the best performance. Accordingly, in view of reduction in influence (erasure of magnetic information) on the adjacent write tracks, it can be said that type B, type C and type A are superior in that order. However, their respective differences are 100 nm, 110 nm and 125 nm, with the result that the difference between type B and type C is not large.

Comparison is next made of the process margin which is another object of embodiments of the present invention. For type B, it can easily be presumed by its structural feature that the flare length (additional errors in wafer processes and an error in a magnetic head slider process (cutting from a wafer)) is changed and the backward length of the soft magnetic film 63 is changed. It was seen from the result from the experimental manufacture by the inventors that this error occurred at about ±70 nm. According to the calculation, if the backward length of the soft magnetic film 63 changes by about +20 nm, then the write field changes by about ±1 kOe (80 kA/m). In view of the write field, it is meant that ±3.5 kOe (280 kA/m) is changed so that high-yield cannot be expected in manufacturing magnetic heads (a non-defective product is within 5% in the variation width of a write field). This produces a need to set the tolerance of the backward length of the soft magnetic film 63 within a range of ±10 nm.

Type C, which is the first embodiment of the present invention, is such that the first soft magnetic film 10 is not exposed to the air bearing surface. Even if the flare point position of the main pole 11 is changed, the backward length of the first soft magnetic film 10 does not change. Thus, a change in the write field intensity resulting from the change of the backward length does not occur. An effect of the soft magnetic film pattern which reduces a leaking magnetic field from the main pole is the same as that of type B in which the soft magnetic film is exposed to the air bearing surface as shown in FIG. 5. Thus, the structure of type C of the first embodiment has a high-process margin and can suppress the broadening of the write field. As described earlier, this effect can be produced only by disposing, on both sides of the main pole 11, the first soft magnetic film 10 receding from the air bearing surface.

Figure 8:
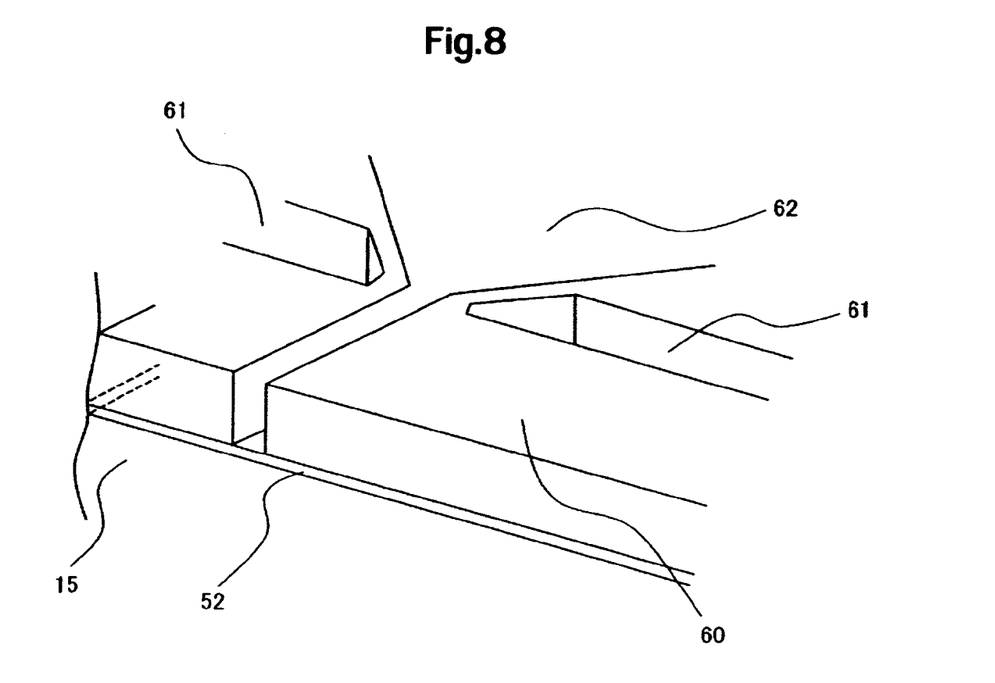
FIG. 8 illustrates a manufacturing step of a write head of the magnetic head according to the first embodiment.
Figure 9:
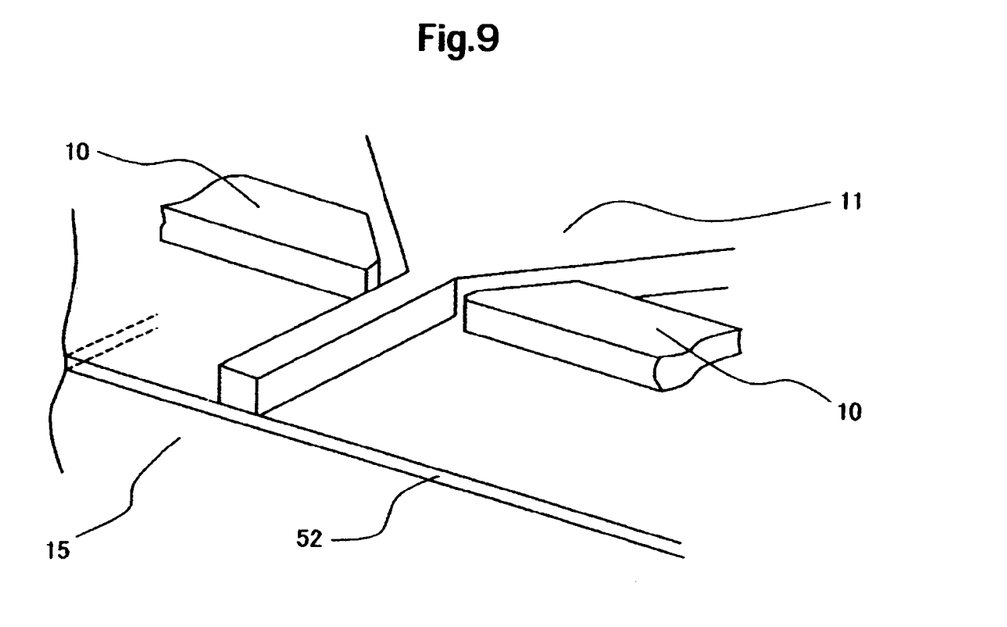
FIG. 9 illustrates a manufacturing step of the write head of the magnetic head according to the first embodiment.
Figure 10:
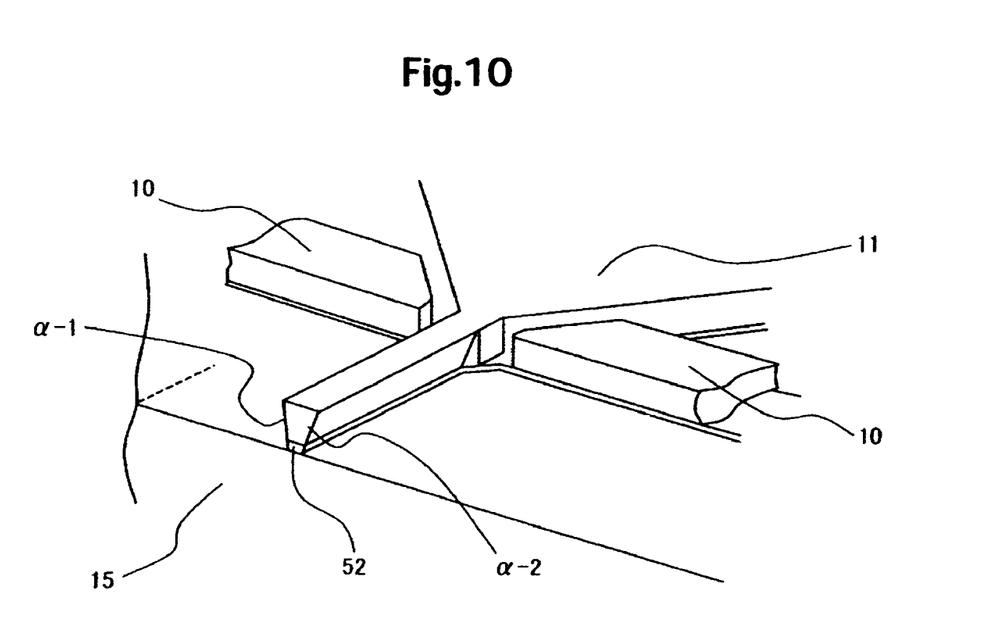
FIG. 10 illustrates a manufacturing step of the write head of the magnetic head according to the first embodiment.

A description is next made of a method of concurrently forming the main pole and the first soft magnetic film pattern which are a major portion of the magnetic head according to the first embodiment. FIGS. 8 through 13 are process diagrams after formation of the read head. FIG. 8 illustrates the state where an underlayer film 52 is formed on the nonmagnetic film 15 and then resist is applied on the underlayer film 52 to form a resist pattern 60. The resist pattern 60 is formed with respective opening portions in a formation area 62 for the main pole 11 and a formation area 61 for the first soft magnetic film 10 so as to expose the underlayer film 52 thereto. The CoNiFe-based alloy becoming the materials of the main pole and first soft magnetic film is deposited by a plating method using the underlayer film 52 as an electrode. A need for the underlayer film 52 is caused by a film-forming method for the main pole. It is not needed to provide the underlayer film 52 if it is not necessary for the underlayer film 52 to serve as an adhesion layer to the nonmagnetic film 15 in the case of a deposition method or a sputtering method. Thereafter, the resist pattern 60 is removed by a solvent or the like to leave only the areas of the main pole 11 and first soft magnetic films 10 as shown in FIG. 9. Next, as shown in FIG. 10, the underlayer film 52 is removed by an ion milling method using the main pole 11 and first soft magnetic films 10 as a mask. The main pole 11 and first soft magnetic films 10 can be formed by the same process using the pattern formation method as described above.

The pattern formed by the above process can be formed also by an etching method after the film becoming the main pole is formed by a plating method, a sputtering method or a deposition method. In this case, the resist pattern is shaped to cover the area of the soft magnetic film pattern and the main pole to be left. Also the soft magnetic film pattern and main pole pattern formed by the etching method can form the magnetic head 1 of the first embodiment by performing the following processes.

After the removal of the underlayer film 52 or the ion milling for pattern formation is performed as described above, an incident angle of the further ion milling is obliquely set to provide an inclination for the edges of the main pole 11 as shown in FIG. 10. Specifically, the main pole edges α-1, α-2 of areas not shaded with the first soft magnetic films 10 are slanted. The pattern is defined so that the end of the first soft magnetic film 10 is located at a position receding from the air bearing surface. Thus, only the area (an edge at the time of cutting the wafer into magnetic head sliders by a post-process) where the main pole 11 is exposed to the air bearing surface by an oblique milling process can be shaped in an inverted trapezoid. Because of having an area smaller than a rectangle, a trapezoid can concentrate magnetic flux, thereby advantageously generating a strong magnetic field.

Figure 11:
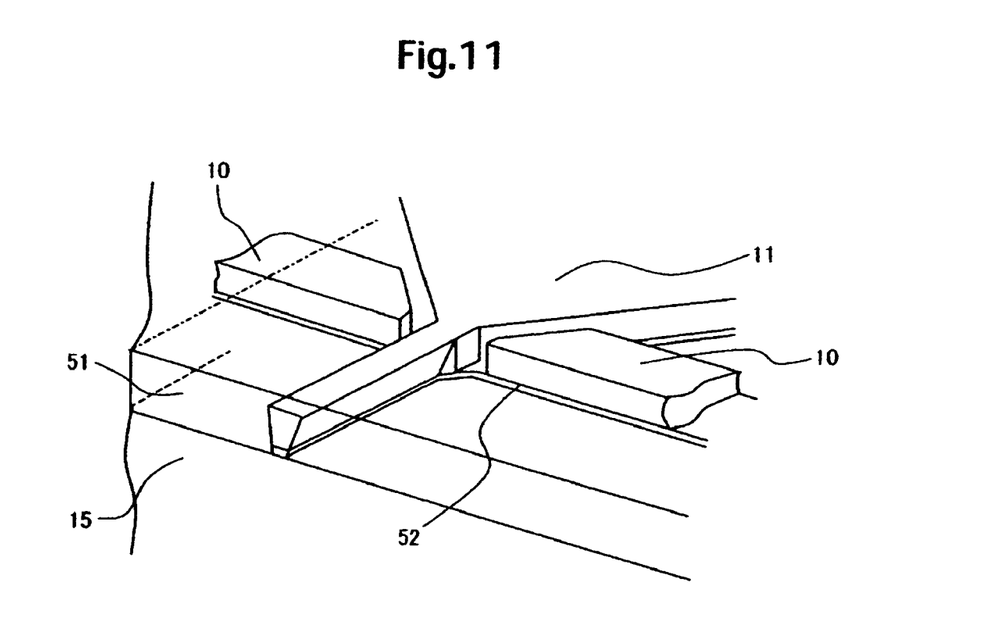
FIG. 11 illustrates a manufacturing step of the write head of the magnetic head according to the first embodiment.
Figure 12:
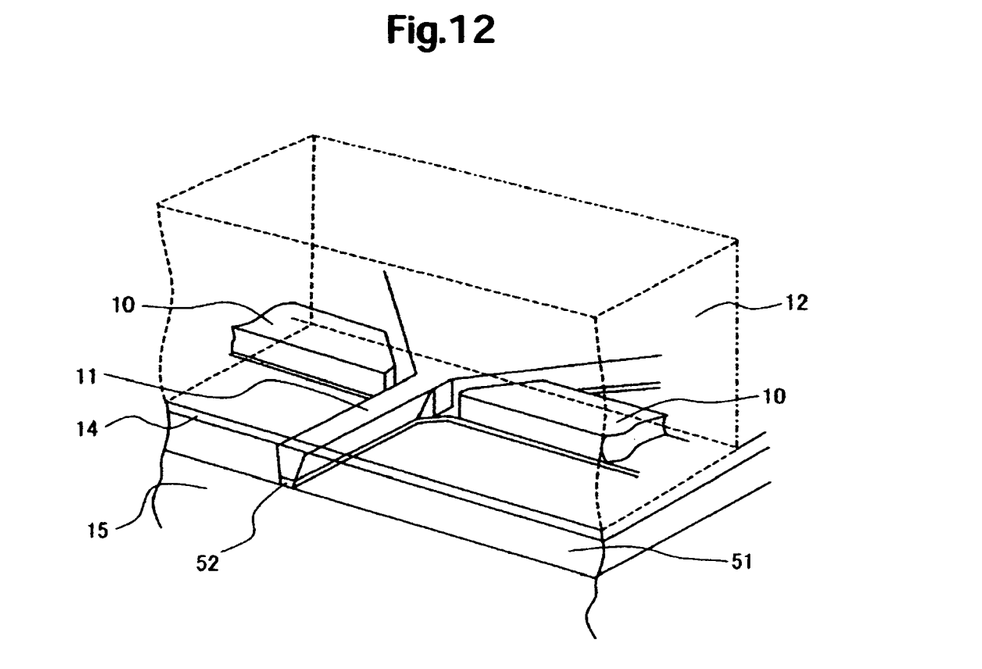
FIG. 12 illustrates a manufacturing step of the write head of the magnetic head according to the first embodiment.

Referring to FIG. 11, thereafter, a nonmagnetic film 51 is formed to cover the main pole 11 and the first soft magnetic film 10. Referring to FIG. 12, the nonmagnetic film 51 is then etched to expose the main pole 11 and the surface of the first soft magnetic film 10. Since it is necessary to perform this etching in a planar manner, a chemical mechanical polishing method (CMP) is used. The terminal point of the etching can be detected from a variation in process speed encountered when the main pole 11 and the surface of the first soft magnetic film 10 appear. The nonmagnetic film 14 is next formed and thereafter the second soft magnetic film 12 is formed.

After the head element portion finally needed on the wafer is formed in the above processes, the wafer is cut into magnetic head sliders. A plane P shown in FIG. 13 indicates a cutout end face, which becomes the air bearing surface 98. During the cutout, the position of the plane P changes in the backward direction. Along with this, the flare point of the main pole 11 is positionally changed. However, the pattern is preliminarily formed so that the air bearing surface side end of the firs soft magnetic film 10 recedes from the position of the air bearing surface. Even if displacement occurs during the processing, the backward length of the first soft magnetic film 10 will not change. Thus, a magnetic head with less variation in field intensity can stably be manufactured. The main pole 11 and the first soft magnetic film 10 are formed of the same material and by the same process; therefore, the manufacturing process of the magnetic head can be shortened to reduce the manufacturing unit cost thereof.

Figure 14:
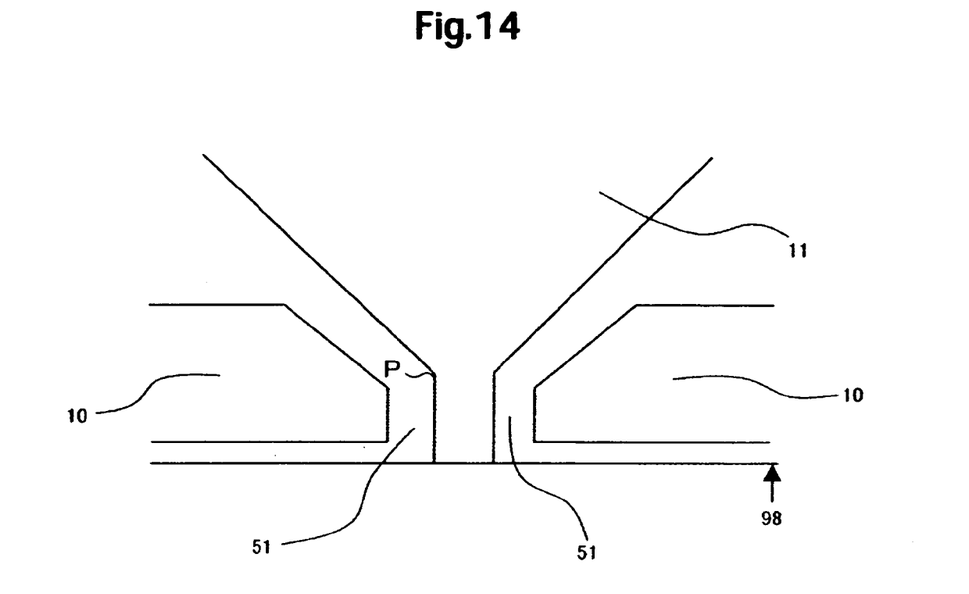
FIG. 14 is a plan view of a first soft magnetic film and main pole of the write head according to the first embodiment.

The effect of the first embodiment is further explained. The first embodiment employs the planar main pole and first soft magnetic film as shown in FIG. 14. FIG. 14 shows the planar shape encountered when such a pattern is formed on the wafer. The main pole 11 extends to the air bearing surface 98, and the width of the exposed portion defines a write track width. The main pole 11 has an area where the track width is equal in a direction preceding from the air bearing surface. The presence of the area having the equal track width produces an effect of keeping the track width uniform even if the cutout position changes at the time of processing the magnetic head slider as described earlier. A point where the width of the main pole 11 changes refers to the flare point P and, in the area receding from the flare point P, the width of the main pole 11 is uniformly enlarged. The magnetic flux of the area converges at the flare point P, so that a strong magnetic field is produced from the tip of the main pole 11 extending to the position of the air bearing surface.

The first soft magnetic film 10 is disposed on both sides of the main pole 11 and the end of the first soft magnetic film 10 recedes 100 nm from the air bearing surface 98 in the present embodiment. Accordingly, the first soft magnetic film 10 is not exposed to the air bearing surface 98 unless the flare point position shifts by a maximum of 100 nm. A magnetic gap 51 is provided between the main pole 11 and the first soft magnetic film 10. A gap 51 of 150 nm is provided in this embodiment. The presence of the gap 51 is equivalent (a structure where the main pole and the soft magnetic film are isolated from each other) to a soft magnetic film structure surrounding the air bearing surface side of the main pole shown in FIG. 7. The backward length of the first soft magnetic film 10 is set at 200 nm. These dimensions are arbitrarily determined based on the resolution capability, field intensity and magnetic field distribution of pattern formation equipment.

Figure 13:
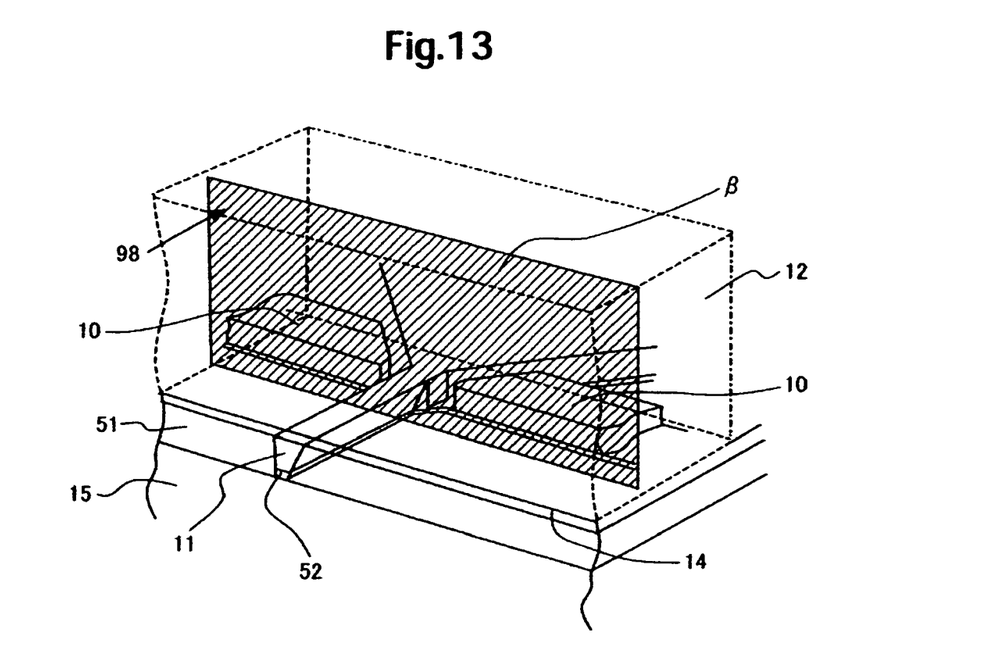
FIG. 13 illustrates a manufacturing step of the write head of the magnetic head according to the first embodiment.

Incidentally, as clearly also from FIG. 13, the cutout plane β of the second soft magnetic film 12 becomes the air bearing surface 98. In other words, the second soft magnetic film 12 is exposed to the air bearing surface. On the other hands, the end of the first soft magnetic film 10 recedes from the air bearing surface 98. Therefore, the end of the second soft magnetic film 12 is closer to the air bearing surface than the air bearing surface side end of the first soft magnetic film 10 in the first embodiment.

With this feature, if the flare point P comes close to the air bearing surface 98, also the first soft magnetic film 10 comes close to the air bearing surface, with the result that the magnetic distance between the first soft magnetic film 10 and the second soft magnetic film 12 is reduced (the magnetic resistance is reduced). It is consequently found that an amount of magnetic flux flowing from the flare point P through the first soft magnetic film 10 to the second soft magnetic film 12 increases to suppress the magnetic field from the main pole 11. In contrast, if the flare point P is remote from the air bearing surface, the magnetic distance between the first soft magnetic film 10 and the second soft magnetic film 12 is increased (the magnetic resistance is increased). It is consequently found that magnetic flux leaking from the flare point P decreases to suppress the lowering of the field intensity.

With the configuration described above, the change of the write field from the main pole resulting from the change of the flare point can be reduced compared with that of the conventional configuration. This effect can be realized by the presence of the first soft magnetic film having the end receding from the air bearing surface and displaced with the flare point position, and the presence of the second soft magnetic film having the end fixed with the position of the air bearing surface used as a reference. Specifically, this is because the magnetic resistance between the first soft magnetic film and the second soft magnetic film varies depending on the flare point position to act to compensate for the intensity of the magnetic field generating from the main pole.

Incidentally, while the magnetic head is described as a combined head having a read element and a write element in the first embodiment described above, a magnetic head having only a write element may be applicable.

Figure 15:
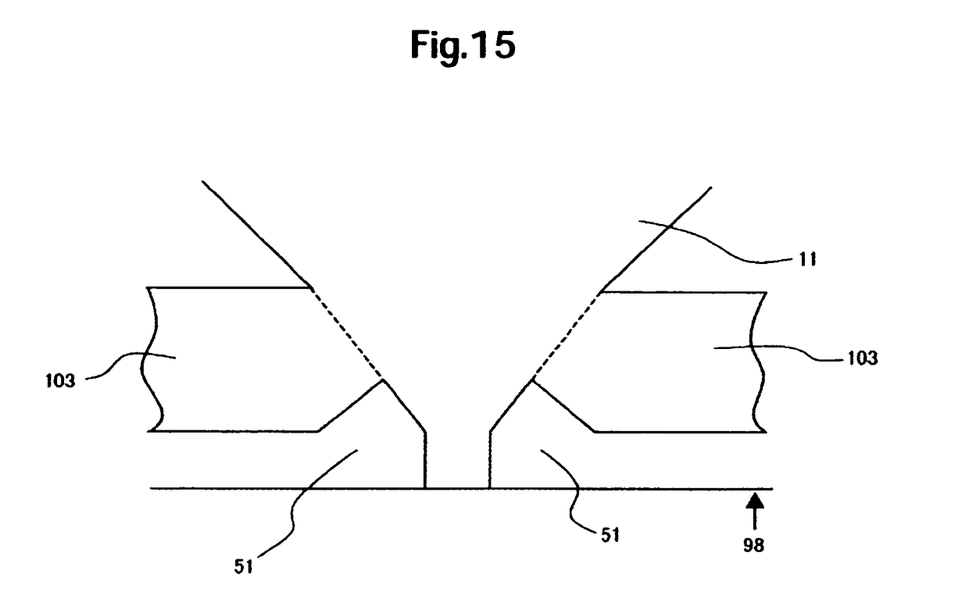
FIG. 15 is a plan view of the first soft magnetic film and main pole of the write head according to a second embodiment.
Figure 16:
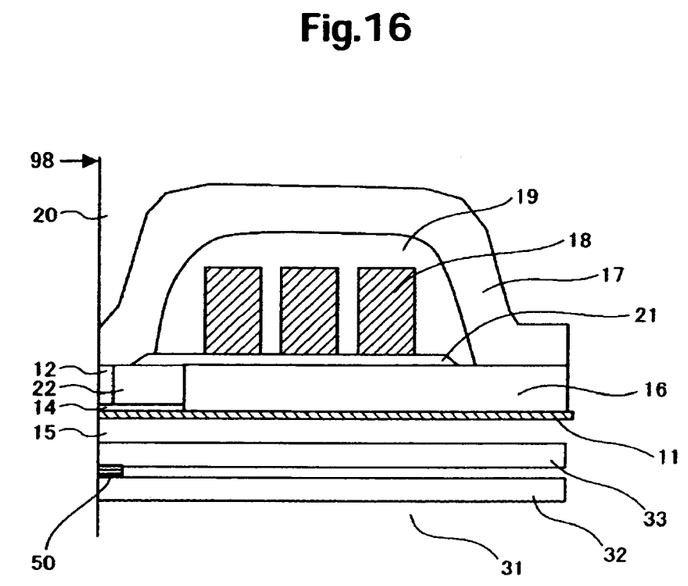
FIG. 16 is a cross-sectional view illustrating another configuration of the magnetic head according to embodiments of the present invention by way of example.

A configuration of a magnetic head according to a second embodiment will be described with reference to FIG. 15. The configuration of the magnetic head according to the second embodiment is the same as that of the first embodiment except the shapes and arrangements of the main pole and first soft magnetic film. Accordingly, FIG. 15 illustrates the shapes and arrangements of the main pole and first soft magnetic film in a plan view. This configuration is characterized by the following. A first soft magnetic film 103 disposed on both sides of the main pole 11 is provided so as to be in direct contact with the main pole 11 not via a gap. An air bearing surface side end of the first soft magnetic film 103 recedes from the air bearing surface and is parallel to the air bearing surface. However, a portion of the first soft magnetic film 103 close to the main pole is shaped to selectively further recede from the air bearing surface. Specifically, the backward length of the first soft magnetic film 103 is 200. A receding amount of the air bearing surface side end from the air bearing surface is 100 nm at a portion remote from the main pole 11 and a maximum of 150 nm at a portion close to the main pole 11. As described above, the air bearing surface side end of the first soft magnetic film 103 is brought close to the air bearing surface at a portion remote from the main pole 11 and the main pole 11 is provided with a flare. Thus, the write field of the main pole 11 can be increased and the broadening of the magnetic field across the track width can be reduced.

A description is next made of other configurations of the magnetic head applied with the soft magnetic film stricture disposed on both sides of the main pole according to the first and second embodiments with reference to FIGS. 16 through 19. In a configuration shown in FIG. 16, an opening portion is provided behind a nonmagnetic film 14 formed on a main pole 11. A lower soft magnetic layer 16 and the main pole 11 are directly magnetically connected to each other through the opening portion. In this configuration, the lower soft magnetic layer 16 and the main pole 11 are directly magnetically connected to each other in a closed magnetic path formed by a second soft magnetic film 12, an upper soft magnetic film 17, the lower soft magnetic film 16 and the main pole 11. Thus, there is an effect that magnetic flux generated at the upper soft magnetic film 17 can be led to the main pole 11 highly efficiently.

Figure 17:
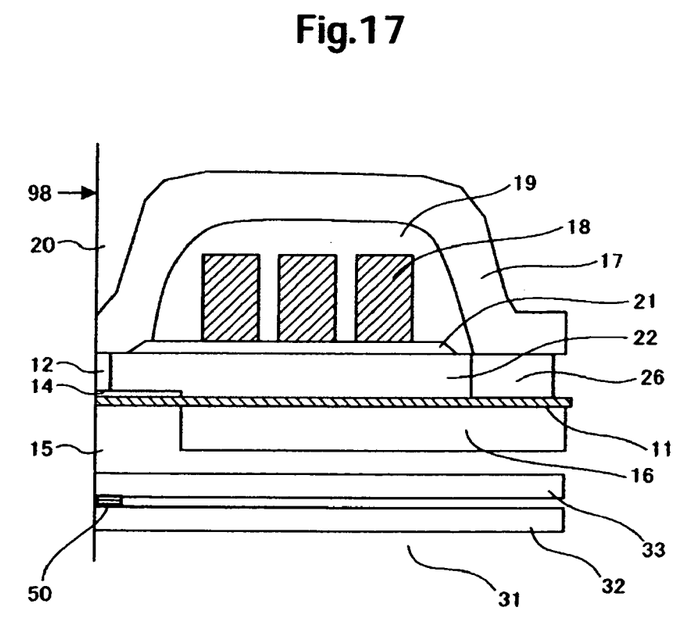
FIG. 17 is a cross-sectional view illustrating another configuration of the magnetic head according to embodiments of the present invention by way of example.

A configuration shown in FIG. 17 is characterized in that a lower soft magnetic layer 16 is provided under the main pole 11 as a lower layer thereof. A magnetic soft film 26 is provided to connect the rear portion of a lower soft magnetic film 17 with the rear portion of the main pole 11. In the present configuration, the magnetic distance between the lower soft magnetic layer 16 and the upper soft magnetic film 17 can be increased. Therefore, an amount of magnetic flux leaking from the lower soft magnetic film 16 to the upper soft magnetic film 17 can be reduced compared with the other configurations. This effect can lead much magnetic flux to the main pole 11, thereby preferably generating a strong magnetic field.

Figure 18:
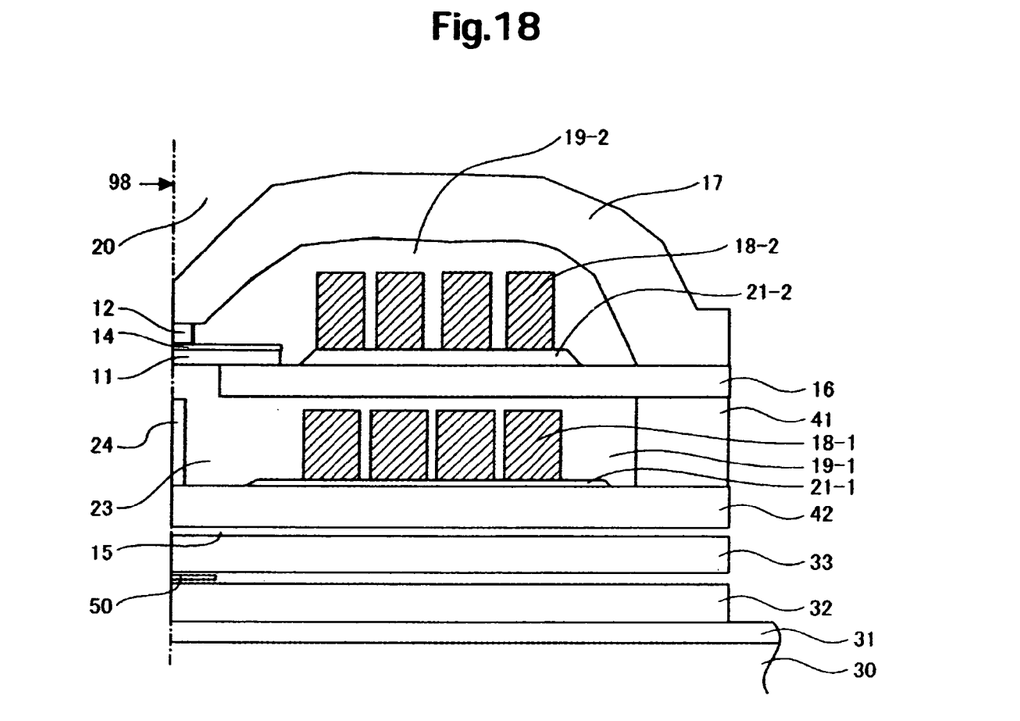
FIG. 18 is a cross-sectional view illustrating another configuration of the magnetic head according to embodiments of the present invention by way of example.

While the configurational examples described above use the single-layer coil, embodiments of the present invention can be applied to a two-layer coil type head in FIG. 18. Similarly to the examples described earlier, a read head and a write head are formed on a slider substrate 30. The read head is basically composed of an insulating layer (underlayer) 31 formed on the slider layer 30, a lower shield 32, an upper shield 33, and an element portion 50 for detecting magnetic information. The write head is isolated from the read head by a nonmagnetic film 15 and includes a second closed magnetic path formed by a lower pole 42, a pedestal pole 24, a main pole 11, an intermediate pole (lower soft magnetic film) 16 and a soft magnetic film 41. A coil 18-1 is provided in the second closed magnetic path. Insulating films 21-1, 19-1 are provided because of application of the current to the coil 18-1. The pedestal pole 24 is connected to the lower pole 42 to take measures against an erasure problem at the lower pole end portion by lowering the magnetic charge distribution on the air bearing surface. A first closed magnetic path is composed of a main pole 11, the lower soft magnetic film 16, an upper soft magnetic film 17, and a second soft magnetic film 12. A coil 18-2 is provided in the first closed magnetic path. Insulating layers 19-2, 21-2 are provided because of application of the current to the coil 18-2. As with the first and second embodiments, a first soft magnetic film 10 (FIG. 14) or 103 (FIG. 15), although not shown, is provided on both sides of the main pole 11 and a nonmagnetic film 14 is provided on the main pole 11. The gradient of a magnetic field generating from the main pole 11 is increased by appropriately maintaining an amount of magnetic flux led from the second soft magnetic film 12. The element structure described above is surrounded by a protection film 20.

Magnetic fields generated by the two coils 18-1, 18-2 putting the main pole 11 therebetween have polarities opposite to each other. However, a common magnetization polarity acts on the intermediate pole (lower soft magnetic film) 16 put between the two coils. Thus, magnetic flux with high-efficiency can be led to the main pole 11 put in the magnetized state equal to that of the intermediate pole (lower soft magnetic film) 16. In contrast, the magnetic fields generated by the coils have polarities opposite to each other; therefore, there is a feature in which magnetic fields leaking from the coils are cancelled each other to have less influences on the recording medium. As described above, formation of the first soft magnetic film 10 (FIG. 14), 103 (FIG. 15) on both sides of the main pole 11 can be applied to such an advanced magnetic head configuration without any impediment.

Figure 19:
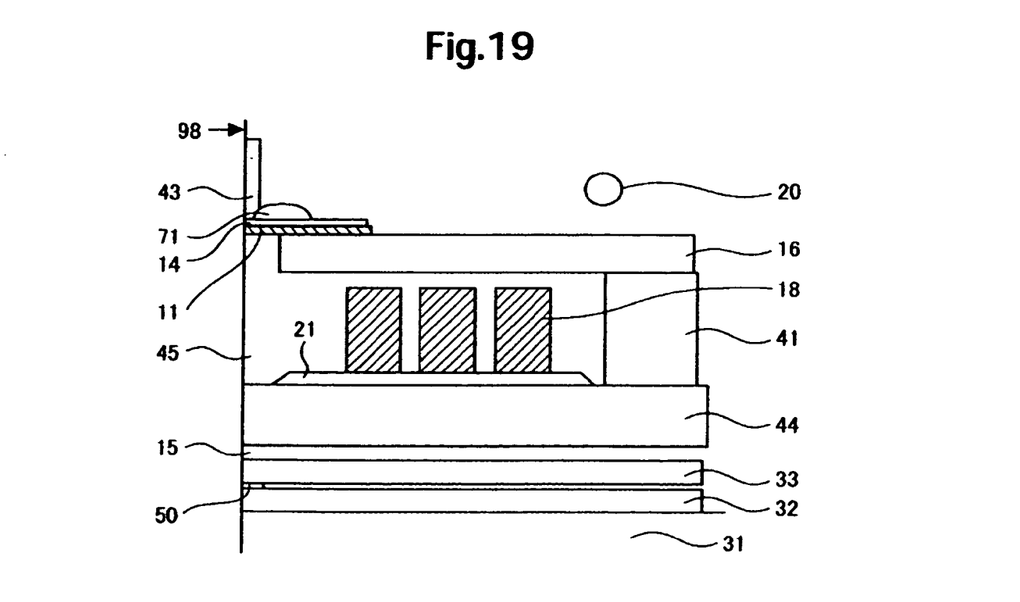
FIG. 19 is a cross-sectional view illustrating another configuration of the magnetic head according to embodiments of the present invention by way of example.

FIG. 19 illustrates a configuration in which embodiments of the present invention are applied to a simple magnetic head structure by way of example. A read head has the same configuration as described earlier. A closed magnetic path is composed of an underlayer soft magnetic film 44, a soft magnetic film 41, a soft magnetic film 16 and a main pole 11 through a nonmagnetic film 15. A coil 18 is provided in the closed magnetic path and necessary electric insulation is ensured by magnetic films 21, 45. This configuration is simplest among the magnetic head structures described above and is composed of the minimum elements of a head for perpendicular magnetic recording. To enable high-density recording, it is necessary to increase the gradient of a write field as described earlier. To meet the necessity, a soft magnetic film 43 is provided on top of the main pole 11 via a nonmagnetic film 14. The thinner the backward thickness (the thickness in the left-right direction in the figure) of the soft magnetic film 43 is, the more preferable for the gradient of a magnetic field, but the narrower the process margin becomes. For this reason, a bump 71 is provided on the nonmagnetic film 14 so as to be close to the air bearing surface 98 and the soft magnetic film 43 is provided to run on the bump 71. This makes it possible to reduce the backward thickness of a portion of the nonmagnetic film 43 close to the main pole. Thus, a magnetic head can be configured simply and suitably for high-density recording. Formation of the first soft magnetic film 10, 103 similar to that of the first and second embodiment on both sides of the main pole 11 can be applied to the configuration of this case without any impediment in order to suppress the broadening of a magnetic field across the track width.

In all the configurations described above, the air bearing surface side end of the first soft magnetic film recedes from the air bearing surface; therefore, the backward length of the first soft magnetic film is not changed during the processing of the main pole and the process margin is large. Since the backward length of the first soft magnetic film is not changed, an effect of suppressing broadening of a write field is small in variation. Since the first soft magnetic film and the main pole can be manufactured by the same process, the manufacturing process can be shortened. Thus, an improvement in the performance of a magnetic head can be compatible with a reduction in the manufacturing cost thereof.

What is claimed is:
1. A magnetic head including a write element, the write element comprising:
   a main pole having a portion extending to an air bearing surface to define a track width and a portion whose width progressively broadens as receding from the air bearing surface;
   a lower soft magnetic film magnetically connected to the main pole and having an air bearing surface side end receded from the air bearing surface and a rear end opposite the air bearing surface side end;
   an upper soft magnetic film having an air bearing surface side end positioned near the air bearing surface and a rear end opposite the air bearing surface side end, wherein the rear end of the upper soft magnetic film is magnetically connected to the rear end of the lower soft magnetic film at a position away from the air bearing surface constituting a closed magnetic path with the lower soft magnetic film;

a coil interlinked with the closed magnetic path;

first soft magnetic films separately disposed on both sides of the main pole in a direction parallel to a plane of deposition of the main pole, the first soft magnetic films each having an air bearing surface side end receded from the air bearing surface; and a second soft magnetic film disposed on a trailing side of the main pole in a track direction, wherein the rear end of the lower soft magnetic film is positioned away from the air bearing surface in a direction perpendicular to the air bearing surface at a position beyond at least some turns of the coil, wherein the rear end of the upper soft magnetic film is positioned away from the air bearing surface in a direction perpendicular to the air bearing surface at a position beyond at least some turns of the coil, and wherein the lower soft magnetic film is a planar film having a longitudinal axis positioned along a line perpendicular to the air bearing surface.

2. The magnetic head according to claim 1, wherein the first soft magnetic films and the main pole are provided on a same layer and in direct contact with the same layer.

3. The magnetic head according to claim 2, wherein the first soft magnetic films and the main pole are made of the same soft magnetic material.

4. The magnetic head according to claim 1, wherein the main pole and the first soft magnetic films are disposed to have a magnetic gap therebetween.

5. The magnetic head according to claim 1, wherein the main pole and the first soft magnetic films are magnetically connected to the second soft magnetic film so as to have a magnetic gap therebetween.

6. The magnetic head according to claim 1, wherein the portion of the main pole extending to the air bearing surface has an inverted trapezoid in cross-section.

7. The magnetic head according to claim 6, wherein the portion of the main pole extending to the air bearing surface is formed rectangular at a position adjacent to the first soft magnetic films and remote from the air bearing surface, sides of the rectangular portion being oriented perpendicular to the air bearing surface.

8. The magnetic head according to claim 1, wherein the air bearing surface side end of the second soft magnetic film is closer to the air bearing surface than the air bearing surface side end of each of the first soft magnetic films.

9. The magnetic head according to claim 1, further comprising a nonmagnetic layer positioned on a trailing side of the main pole in a track direction near the portion of the main pole extending to the air bearing surface and directly above the main pole, wherein the second soft magnetic film is magnetically coupled to the main pole through the nonmagnetic layer.

10. The magnetic head according to claim 1, further comprising a read element provided adjacent to the write element.

11. The magnetic head according to claim 1, wherein each of the lower soft magnetic film and the upper soft magnetic film are positioned on the trailing side of the main pole and aligned therewith in a track direction.

* * * * *